United States Patent
Lee et al.

(10) Patent No.: US 8,055,661 B2
(45) Date of Patent: Nov. 8, 2011

(54) DEVICE AND METHOD FOR AUTOMATICALLY GENERATING ONTOLOGY INSTANCE

(75) Inventors: Changki Lee, Daejeon (KR); Jihyun Wang, Daejeon (KR); Miran Choi, Daejeon (KR); Myunggil Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 400 days.

(21) Appl. No.: 12/163,185

(22) Filed: Jun. 27, 2008

(65) Prior Publication Data

US 2009/0100090 A1 Apr. 16, 2009

(30) Foreign Application Priority Data

Oct. 15, 2007 (KR) .................. 10-2007-0103554

(51) Int. Cl.
*G06F 17/30* (2006.01)
(52) U.S. Cl. .................. 707/737; 707/740
(58) Field of Classification Search .......... 707/740, 707/737
See application file for complete search history.

(56) References Cited

U.S. PATENT DOCUMENTS 7,689,557 B2 * 3/2010 Pandit et al. .......... 707/771

2005/0108256 A1 * 5/2005 Wakefield et al. .......... 707/100
2008/0021700 A1 * 1/2008 Moitra et al. .......... 704/9

FOREIGN PATENT DOCUMENTS

| KR | 1020050065196 A | 6/2005 |
| KR | 1020070008994 A | 1/2007 |
| KR | 10-0729103 B1 | 6/2007 |
| KR | 1020070065774 A | 6/2007 |

OTHER PUBLICATIONS

Hae-Jung Kim et al., "*Automatic Ontology Construction for Semantic Relevance in Question Answering System*", Proceedings of 2003 Fall Conference, Book 30, Part2(I), Oct. 2003, p. 109-111, Korea Information Science Society.

* cited by examiner

*Primary Examiner* — Hung Q Pham

(57) ABSTRACT

The present invention relates to a method and device for generating an ontology instance that classifies documents into structured documents and unstructured documents and automatically generates ontology instances. The method includes collecting documents corresponding to classes of an ontology from Web; if the collected documents are unstructured documents, extracting inter-entity relationship information from the unstructured documents; if the collected documents are structured documents, extracting inter-entity relationship information from the structured documents; generating ontology instances from the extracted inter-entity relationship information, and mapping the generated ontology instances to corresponding classes of the ontology.

6 Claims, 3 Drawing Sheets

DEVICE AND METHOD FOR AUTOMATICALLY GENERATING ONTOLOGY INSTANCE

BACKGROUND OF THE INVENTION

1. Field of the Invention

The present invention relates a device and method for automatically generating an ontology instance, and more particularly, to a device and method for automatically generating an ontology instance that extracts entities and inter-entity relationships from structured documents and unstructured documents on the Internet and generates/stores ontology instances.

This work was supported by the IT R&D program of MIC/IITA [2006-S-036-02, Development of large vocabulary/interactive distributed/embedded VUI for new growth engine industries].

2. Description of the Related Art

A knowledge representing technology, which more naturally represents actual knowledge and can automatically induce new knowledge through logical inference, has been actively researched in recent years, after a data-based technology that represents and uses data on the basis of a relational model. A typical technology development trend is a Semantic Web technology.

Semantic Web is the next generation intelligent Web in which a computer can understand the meanings of knowledge resources and logically infer the meanings. The Semantic Web is a framework and technology that represents information about resources (web documents, various files, services, and the like) and relationship-meanings information (Semantics) between resources in distributed computing environment such as the present Internet by a machine (computer) processable form and allows an automated machine (computer) to process the information. Resources, information, knowledge, and the like are defined as a concept of an ontology under the framework. Accordingly, the ontology is knowledge that is obtained by formally and clearly specifying various information resources on the Internet so as to be processed by a computer.

However, since various information provided from the Internet is not standardized in a predetermined format, it is difficult to collect various information, to represent various information in the form of an ontology, and to convert various information into ontology instances.

A Large-scale Ontology Generation System, which integrates independent knowledge distributed on the Internet and generates consistent knowledge information, has been disclosed in Korean Patent application Publication No. 2005-0065196. The system collects knowledge that exists on knowledge servers distributed on Internet, and generates relationship information of the knowledge, thereby generating consistent and integrated knowledge information.

However, since the system operates under a premise that knowledge exists on knowledge servers, there is a problem in that the system is difficult to be applied to knowledge information not having a format. Therefore, it is not possible to collect and integrate knowledge information generated by a system that is not designed on the basis of an ontology. For this reason, there is a limitation on the collection of knowledge information.

SUMMARY OF THE INVENTION

The present invention has been made to solve the above-mentioned problem, and it is an object of the present invention to generate ontology instances from documents that do not exist in a knowledge server, that is, documents that are not in the form of an ontology.

In order to achieve the above-mentioned object, according to an embodiment of the present invention, a method of automatically generating an ontology instance includes the steps of (a) collecting documents corresponding to classes of an ontology from Web; if the collected documents are unstructured documents, (b) extracting inter-entity relationship information from the unstructured documents; if the collected documents are structured documents, (c) extracting inter-entity relationship information from the structured documents; (d) generating ontology instances from the extracted inter-entity relationship information; and (e) mapping the generated ontology instances to corresponding classes of the ontology.

More particularly, the step (b) may include the steps of (b1) recognizing entity names from the unstructured documents, (b2) recognizing substitutes from the unstructured documents, and (b3) extracting inter-entity relationship information from the recognized entity names and the recognized substitutes.

The step (b2) may include restoring the recognized substitutes into corresponding entity names.

The step (b3) may include the steps of (b31) generating characteristics, which are used to extract the inter-entity relationship information, by using the recognized entity names and the recognized substitutes; and (b32) extracting the inter-entity relationship information by using the generated characteristics and the ontology.

The step (c) may include the steps of (c-1) extracting a table from the structured documents, and (c-2) extracting inter-entity relationship information from the extracted table.

The step (d) may include a step of removing reduplicated relationship information from the extracted inter-entity relationship information.

In order to achieve the above-mentioned object, according to another embodiment of the present invention, a device for automatically generating an ontology instance includes a document collecting unit that collects documents corresponding to classes of an ontology; an unstructured document-relationship information extracting unit that extracts inter-entity relationship information from unstructured documents; a structured document-relationship information extracting unit that extracts inter-entity relationship information from structured documents; an instance generating unit that generates ontology instances from the relationship information extracted by the unstructured document-relationship information extracting unit and the structured document-relationship information extracting unit; and an instance mapping unit that maps the ontology instances generated by the instance generating unit to corresponding classes of the ontology. If the collected documents are unstructured documents, the document collecting unit inputs the unstructured documents to the unstructured document-relationship information extracting unit. If the collected documents are structured documents, the document collecting unit inputs the structured documents to the structured document-relationship information extracting unit.

More particularly, the unstructured document-relationship information extracting unit may include an entity name recognizing unit that recognizes entity names from the unstructured documents, a substitute recognizing unit that recognizes substitutes from the unstructured documents, and an entity-relationship extracting unit that extracts inter-entity relationship information from the recognized entity names and the recognized substitutes.

The substitute recognizing unit may include a substitute recognizing module that recognizes substitutes from the unstructured documents, and a substitute restoring module that restores the recognized substitutes into corresponding entity names.

The entity-relationship extracting unit may include an entity-relationship extraction characteristic generating module and an entity-relationship extracting module. The entity-relationship extraction characteristic generating module generates characteristics, which are used to extract inter-entity relationships, by using the recognized entity names and the recognized substitutes. The entity-relationship extracting module extracts inter-entity relationship information by using the generated characteristics and the ontology.

The structured document-relationship information extracting unit may include a table extracting unit that extracts a table from the structured documents, and a relationship information extracting unit that extracts inter-entity relationship information from the table extracted by the table extracting unit.

The instance generating unit may remove reduplicated relationship information from the inter-entity relationship information that is extracted by the entity-relationship extracting unit and the relationship information extracting unit.

The device for automatically generating an ontology instance according to the embodiment of the present invention classifies documents into structured documents and unstructured documents on the Web, and generates instances. Therefore, it is possible to more accurately and efficiently generate the instances. Further, even though the documents are unstructured documents, it is possible to more accurately and efficiently generate the ontology instances by using a process for recognizing entity names, a process for recognizing substitutes, and a process for extracting inter-entity relationships.

DESCRIPTION OF THE PREFERRED EMBODIMENTS

A preferred embodiment of the present invention will be described in detail below with reference to accompanying drawings.

Figure 1:
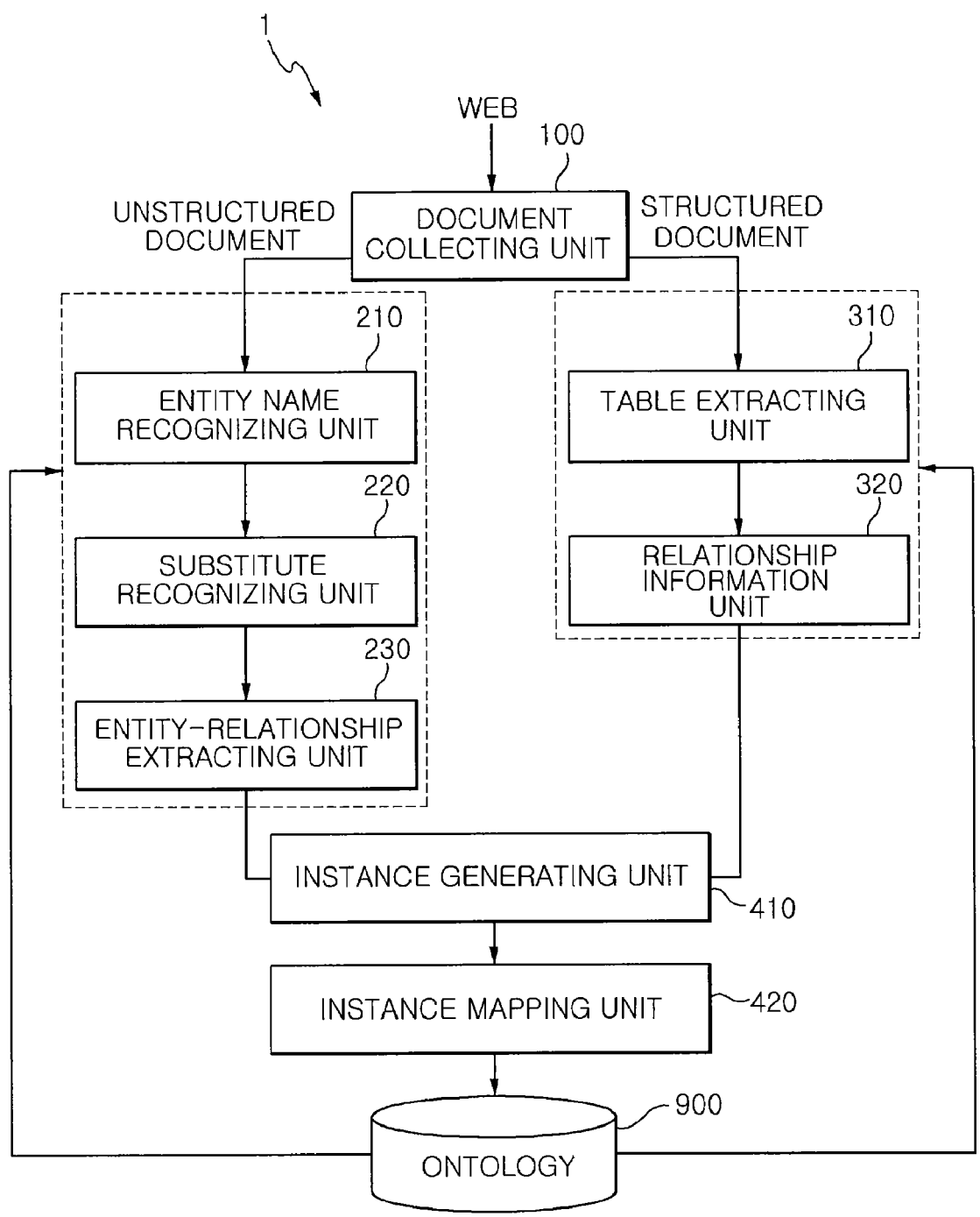
FIG. 1 is a block diagram of a device for automatically generating an ontology instance according to an embodiment of the present invention.

FIG. 1 is a block diagram of a device 1 for automatically generating an ontology instance according to an embodiment of the present invention.

The device 1 for automatically generating an ontology instance includes a document collecting unit 100, an entity name recognizing unit 210, a substitute recognizing unit 220, an entity-relationship extracting unit 230, a table extracting unit 310, a relationship information extracting unit 320, an instance generating unit 410, and an instance mapping unit 420.

The document collecting unit 100 collects various documents from the Web. The various documents do not require specific format, and are classified into structured documents and unstructured documents depending on whether information in the documents to be collected is in the form of a table.

If the collected documents are unstructured documents, the entity name recognizing unit 210, the substitute recognizing unit 220, and the entity-relationship extracting unit 230 are provided to extract inter-entity relationship information from the unstructured documents.

The entity name recognizing unit 210 extracts entities from sentences of the unstructured documents in order to recognize entity names. The entity name recognizing unit 210 may include a morpheme analyzing module 211, an entity name characteristic generating module 212, and an entity name recognizing module 213.

The substitute recognizing unit 220 may further include a substitute recognizing module 221 and a substitute restoring module 222. The substitute recognizing module recognizes substitutes, which are represented by, for example, pronouns in the sentences of the unstructured documents. The substitute restoring module restores the recognized substitutes into entity names.

The entity-relationship extracting unit 230 extracts inter-entity relationships from the extracted entity names, and may include an entity-relationship extraction characteristic generating module 231 and an entity-relationship extracting module 232. The entity-relationship extraction characteristic generating module generates characteristics used to extract entity relationships, and the entity-relationship extracting module extracts inter-entity relationships from the generated characteristics.

If the collected documents are structured documents, the table extracting unit 310 and the relationship information extracting unit 320 are provided to extract inter-entity relationship information from the structured documents.

The table extracting unit 310 extracts tables, from which information is to be extracted, from the structured documents.

The relationship information extracting unit 320 extracts relationship information from the extracted table.

The instance generating unit 410 generates ontology instances on the basis of the relationship information that is received from the entity-relationship extracting unit 230 or the relationship information extracting unit 320.

The instance mapping unit 420 maps the generated ontology instances to corresponding classes with reference to an ontology 900, and then stores the ontology instances.

A method of generating an ontology according to another embodiment of the present invention will be described with reference to FIG. 1.

The document collecting unit 100 collects documents, which correspond to each of the classes of the ontology, with reference to the ontology 900. If the information recorded in the collected documents is described in the form of a table, the collected documents are classified into the structured documents. If the information recorded in the collected documents is not described in the form of a table, the collected documents are classified into the unstructured documents.

If the collected documents are structured documents, corresponding documents are sent to the table extracting unit 310. If the collected documents are unstructured documents, corresponding documents are sent to the entity name recognizing unit 210.

First, a case in which the collected documents are unstructured documents will be described. The unstructured documents may be documents that include, for example, sentences. A case in which sentences are extracted from unstructured documents will be exemplified below.

The entity name recognizing unit 210 recognizes entity names for the extracted sentences. For example, assuming that the following sentences are extracted:

Sentence 1: Samsung Electronics Co. Ltd. (Chairman Kun-Hee Lee) developed a DMB technology. This company is located in Suwon.

Figure 2:
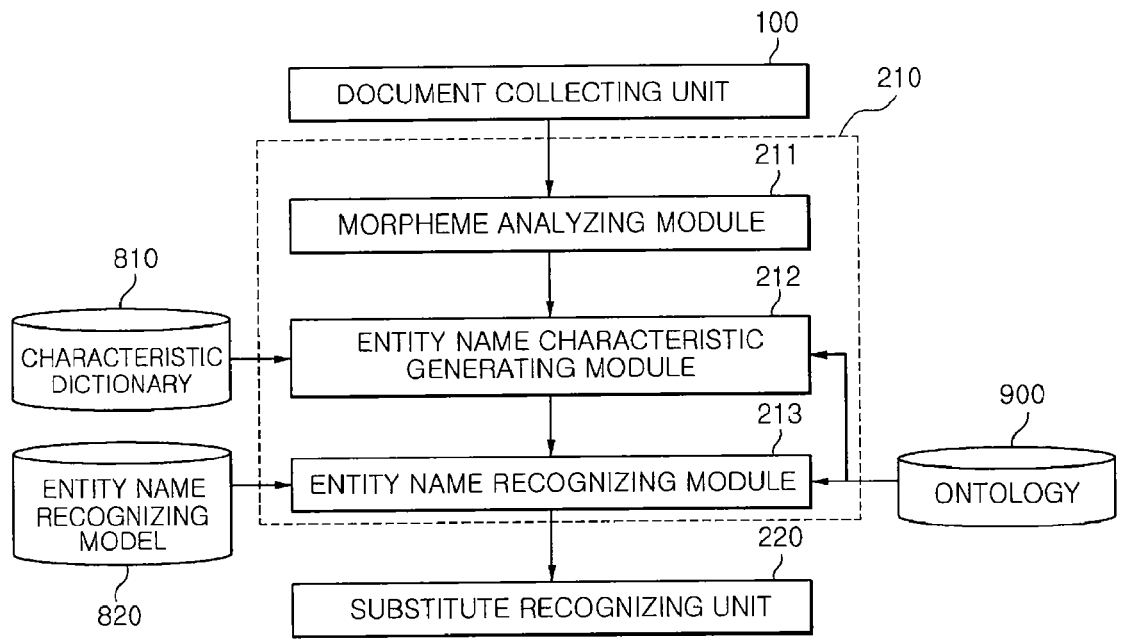
FIG. 2 is a block diagram of an operation module of an entity name recognizing unit of the device for automatically generating an ontology instance according to the embodiment of the present invention.
Figure 3:
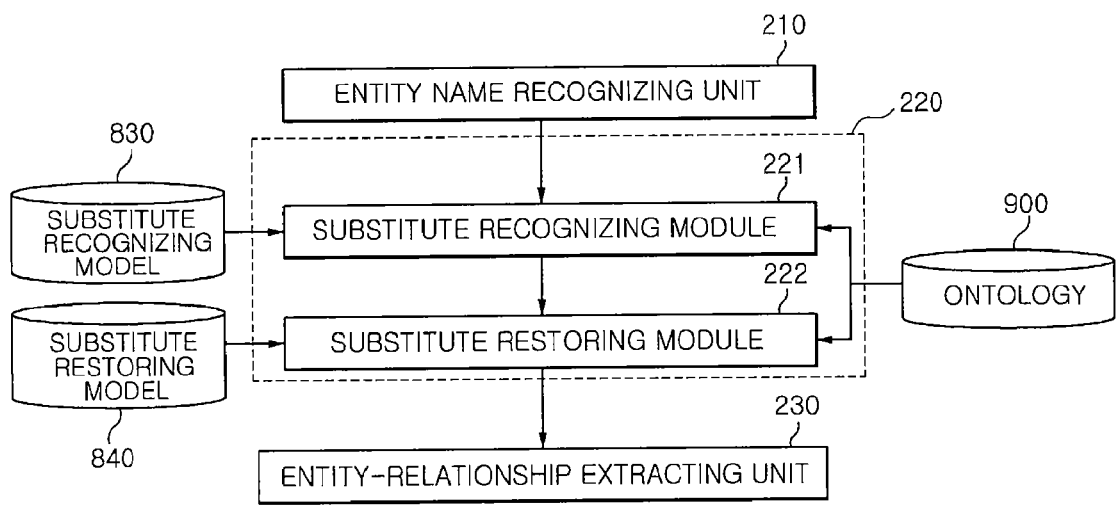
FIG. 3 is a block diagram of an operation module of a substitute recognizing unit of the device for automatically generating an ontology instance according to the embodiment of the present invention.
Figure 4:
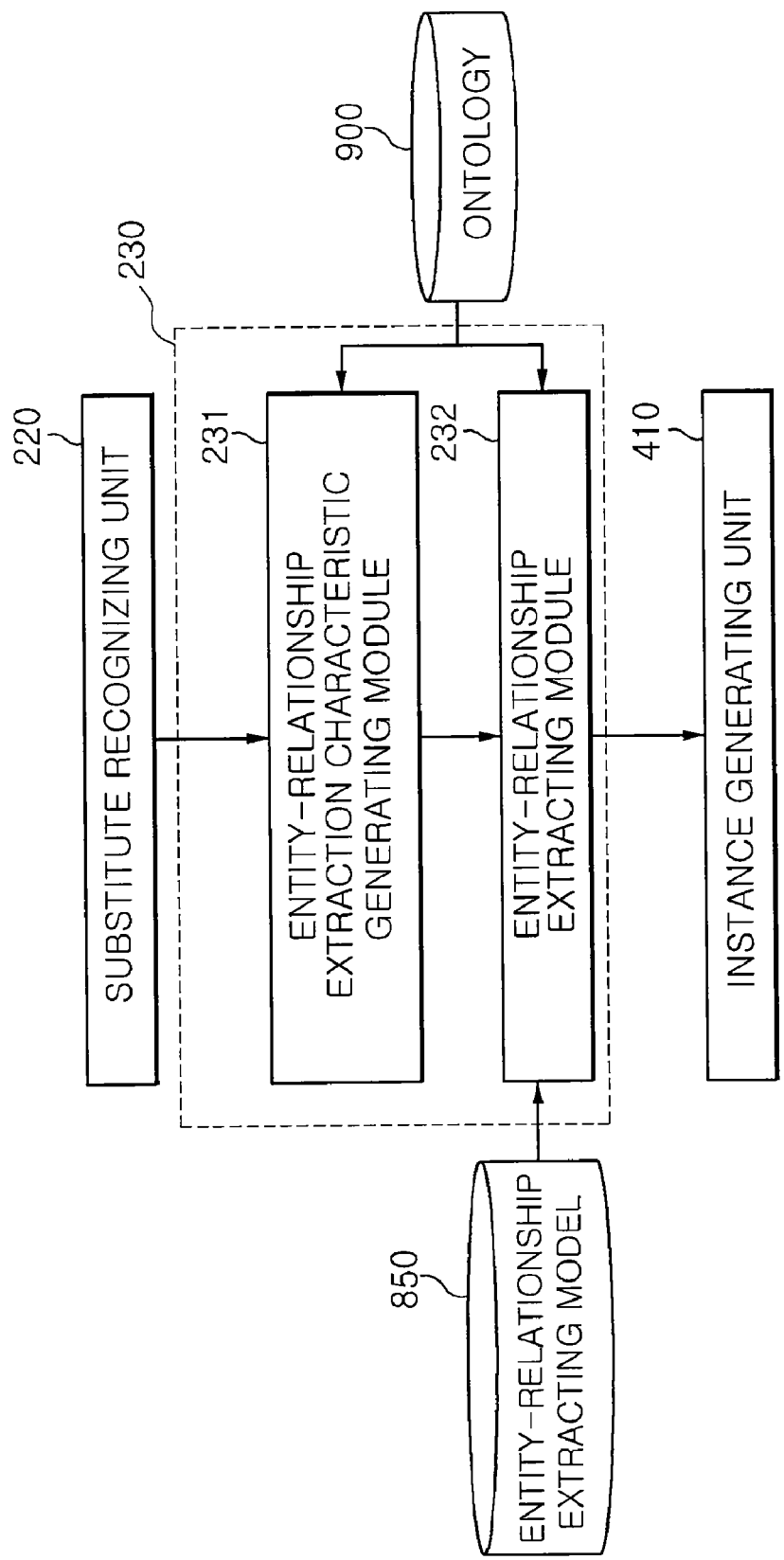
FIG. 4 is a block diagram of an operation module of an entity-relationship extracting unit of the device for automatically generating an ontology instance according to the embodiment of the present invention.

The entity name recognizing unit 210 recognizes "Samsung Electronics Co. Ltd.", "Kun-Hee Lee", and "Suwon" as entity names for Sentence 1. The recognition of these entity names is performed by the morpheme analyzing module 211, the entity name characteristic generating module 212, and the entity name recognizing module 213 that are shown in FIG. 2. The morpheme analyzing module 211 parses the sentences on a morpheme basis. The entity name characteristic generating module 212 referring to a characteristic dictionary 810 generates a characteristic of each of the entity names from the parsed sentences. The entity name recognizing module 213 recognizes the entity names with reference to an entity name recognizing model 820, and outputs results in which each of the entity names of which characteristics are generated is recognized.

When Sentence 1 is processed by the entity name recognizing unit 210, the following is output.

Sentence 2: <Samsung Electronics Co. Ltd.:ORG> (Chairman <Kun-Hee Lee:PER>)) developed a DMB technology. This company is located in <Suwon:LOC>.

As for Sentence 1, "Samsung Electronics Co. Ltd.", "Kun-Hee Lee", "Suwon" are recognized as entity names, and the characteristics of ORG (organization), PER (person), and LOC (location) are generated.

Sentence 2 processed by the entity name recognizing unit 210 is input to the substitute recognizing unit 220.

The substitute recognizing unit 220 recognizes substitutes included in the sentences, and searches for entity names that are indicated by the substitutes. The substitute recognizing unit 220 may include a substitute recognizing module 221 and a substitute restoring module 222. The substitute recognizing module 221 recognizes the substitutes with reference to a substitute recognizing model 830, and the substitute restoring module 222 restores the recognized substitutes into appropriate entity names with reference to a substitute restoring model 840.

Substitutes are recognized from Sentence 2 (Sentence 3), and the restoration results (Sentence 4) are as follows:

Sentence 3: <Samsung Electronics Co. Ltd.:ORG> (Chairman <Kun-Hee Lee:PER>) developed a DMB technology. <This company: C ORG> is located in <Suwon:LOC>.

Sentence 4: <Samsung Electronics Co. Ltd.:ORG> (Chairman <Kun-Hee Lee:PER>) developed a DMB technology. <Samsung Electronics Co. Ltd.:ORG> is located in <Suwon: LOC>.

The sentence processed by the substitute recognizing unit 220 is input to the entity-relationship extracting unit 230. The entity-relationship extracting unit 230 grasps inter-entity relationship information from entity names that are extracted by the entity name recognizing unit 210 and the substitutes (substitutes restored into entity names) that are recognized by the substitute recognizing unit 220. Specifically, the entity-relationship extracting unit 230 includes an entity-relationship extraction characteristic generating module 231 and an entity-relationship extracting module 232.

The entity-relationship extraction characteristic generating module 231 generates characteristics with reference to the ontology 900 in order to grasp whether there are inter-entity relationships recognized by the entity name recognizing unit 210 and the substitute recognizing unit 220. After that, the entity-relationship extracting module 232 extracts relationship information between the entities by using an entity-relationship extracting model 850. The result of the entity-relationship extracted from Sentence 4 is as follows:

Result of Entity-Relationship:

has CEO (<Samsung Electronics Co. Ltd.:ORG>, <Kun-Hee Lee: PER>)

is located (<Samsung Electronics Co. Ltd.:ORG>, <Suwon: LOC>)

The inter-entity relationship information extracted as described above is input to the instance generating unit 410. The instance generating unit 410 removes reduplicated knowledge from the extracted inter-entity relationship information, and generates ontology instances from the inter-entity relationship information.

The generated ontology instances are input to the instance mapping unit 420. The instance mapping unit 420 searches for corresponding classes on the ontology 900, and maps the generated ontology instances to corresponding classes.

If the documents collected by the document collecting unit 100 are structured documents, the collected documents are not input to the entity name recognizing unit 210 and are input to the table extracting unit 310.

The table extracting unit 310 extracts a table of which structured documents include necessary information. The extracted table is input to the relationship information extracting unit 320.

The relationship information extracting unit 320 extracts relationship information from the table, and the relationship information may be processed by a known wrapper technology. If the wrapper technology is used, it is possible to extract relationship information between entities of the table from the table. Accordingly, the extraction results are only subject to partially formal converting processes without additional processes, and may then be input to the instance generating unit 410.

After the extraction results are input to the instance generating unit 410, the processes are the same as the processes of the unstructured documents.

The method and device for generating an ontology instance according to the present invention are not limited to the above-mentioned embodiments, and may be modified in various ways without departing from the scope of the present invention. For example, if the collected documents are structured documents, after the table is extracted, the processes may be the same as the processes of unstructured documents.

Further, if the documents include table-type knowledge and other-type knowledge, the only table-type knowledge is subject to a process for extracting structured document relationship information and other knowledge may be subject to a process for extracting unstructured document relationship information. Alternatively, after the table is extracted, unstructured document-type knowledge except for the table may be input to a process for extracting unstructured document relationship information.

What is claimed is:

1. A method of automatically generating an ontology instance, the method comprising:

collecting documents corresponding to classes of an ontology;

classifying the collected documents into unstructured documents and structured documents depending on whether information in the collected documents is in the form of a table;

if the collected documents are unstructured documents, extracting first relationship information from the unstructured documents based on characteristics of entities, wherein the first relationship information represents relationships between entities in sentences of the unstructured document;

if the collected documents are structured documents, extracting second relationship information from the structured documents based on characteristics of entities, wherein the second relationship information represents relationships between entities in a table of the structured documents;

generating ontology instances from the first relationship information or the second relationship information; and mapping the generated ontology instances to corresponding classes of the ontology, wherein the extracting of the first relationship information is performed using a different process from that used to extract the second relationship information, wherein the extracting of the first relationship information from the unstructured documents includes:

recognizing entity names from the unstructured documents;

recognizing substitutes from the unstructured documents, wherein the substitutes are represented by pronouns in the sentences of the unstructured documents; and extracting the first relationship information from the recognized entity names and the recognized substitutes, and wherein the recognizing of the substitutes includes restoring the recognized substitutes into corresponding entity names.

2. The method according to claim 1, wherein the extracting of the first relationship information from the recognized entity names and the recognized substitutes includes:

generating characteristics of the entity names by using the recognized entity names and the recognized substitutes; and extracting the first relationship information by using the generated characteristics and the ontology.

3. The method according to claim 1, wherein the extracting of the first relationship information from the recognized entity names and the recognized substitutes includes:

generating characteristics of the entity names, which are used to extract the first relationship information, by using the recognized entity names and the recognized substitutes; and extracting the inter relationship information by using the generated characteristics and the ontology.

4. The method according to claim 1, wherein the extracting of the second relationship information from the structured documents includes:

extracting the table from the structured documents; and extracting the second relationship information from the extracted table.

5. The method according to claim 1, wherein the generating of the ontology instances includes:

removing reduplicated relationship information from the first relationship information or the second relationship information, or both.

6. The method according to claim 1, wherein the recognizing of the entity names comprises:

parsing the sentences of the unstructured documents on a morpheme basis;

generating a characteristic of each of the entity names from the parsed sentences using a characteristic dictionary; and recognizing the entity names using an entity name recognizing model.

* * * * *